United States Patent
Bittner et al.

(10) Patent No.: US 11,323,020 B2
(45) Date of Patent: May 3, 2022

(54) CIRCUIT DEVICE HAVING A POWER CONVERTER AND A CAPACITOR DISCHARGE DEVICE

(71) Applicant: SEMIKRON ELEKTRONIK GMBH & CO. KG, Nuremberg (DE)

(72) Inventors: Roland Bittner, Stegaurach (DE); Jochen Kraus, Nuremberg (DE); Robin Koschinski, Nuremberg (DE); Sebastian Hettrich, Schwabach (DE)

(73) Assignee: SEMIKRON ELEKTRONIK GMBH & CO. KG, Nuremberg (DE)

( * ) Notice: Subject to any disclaimer, the term of this patent is extended or adjusted under 35 U.S.C. 154(b) by 341 days.

(21) Appl. No.: 16/750,075

(22) Filed: Jan. 23, 2020

(65) Prior Publication Data
US 2020/0259408 A1    Aug. 13, 2020

(30) Foreign Application Priority Data
Feb. 12, 2019    (DE) .................... 10 2019 103 404.3

(51) Int. Cl.
*H02J 7/00*    (2006.01)
*H02M 1/32*    (2007.01)
*H02M 7/5387*    (2007.01)

(52) U.S. Cl.
CPC ......... *H02M 1/32* (2013.01); *H02M 7/53871* (2013.01); *H02M 1/322* (2021.05)

(58) Field of Classification Search
USPC ............................... 320/107, 165, 166, 167
See application file for complete search history.

(56) References Cited

U.S. PATENT DOCUMENTS 6,445,598 B1 *   9/2002   Yamada ............ H02M 3/33523
                                                         363/97
9,692,296 B1 *   6/2017   Dash ....................... H02M 3/04
(Continued)

FOREIGN PATENT DOCUMENTS

DE    10 2008 010 978    8/2009
DE    10 2014 110 768    6/2015
(Continued)

OTHER PUBLICATIONS

DE 10 2019 103 404.3, German Search Report dated Oct. 31, 2019, 4 pages—German, 2 pages—English.
(Continued)

*Primary Examiner* — Brian Ngo
(74) *Attorney, Agent, or Firm* — Andrew F. Young; Nolte Lackenbach Siegel

(57) ABSTRACT

A circuit device has a power converter, which includes power semiconductor switches and a capacitor which is connected to a first and a second intermediate circuit conductor in an electrically conductive manner, and having a capacitor discharge device for the electrical discharging of the capacitor. The capacitor discharge device includes an actuation device, an electrical discharge resistor and a first semiconductor switch having a first and a second load current terminal, and having a control terminal. The first load current terminal of the first semiconductor switch is connected to the first intermediate circuit conductor via the discharge resistor, and the second load current terminal of the first semiconductor switch connects to the second intermediate circuit conductor. The actuation device on the control terminal of the first semiconductor switch generates an actuating voltage, in accordance with a control signal, for the closing and opening of the first semiconductor switch, and having a capacitor discharge monitoring device, which is designed to monitor an electric monitoring voltage which (Continued)

is present between the first load current terminal of the first semiconductor switch and the second intermediate circuit conductor and, in the event that the monitoring voltage is lower than a monitoring voltage limiting value, to generate a capacitor discharge signal.

6 Claims, 1 Drawing Sheet

(56) References Cited

U.S. PATENT DOCUMENTS

| | | | |
|---|---|---|---|
| 2003/0107349 A1* | 6/2003 | Haydock | H02M 5/458 |
| | | | 322/28 |
| 2009/0284199 A1* | 11/2009 | Kitanaka | H02M 1/12 |
| | | | 336/175 |
| 2019/0238060 A1* | 8/2019 | telefus | H02M 7/2176 |

FOREIGN PATENT DOCUMENTS

| | | |
|---|---|---|
| EP | 2 639 916 | 9/2013 |
| GB | 2 433 358 | 12/2005 |

OTHER PUBLICATIONS

DE 10 2019 103 404.3, German Search Report dated Mar. 4, 2019, 8 pages—German, 4 pages—English.

\* cited by examiner

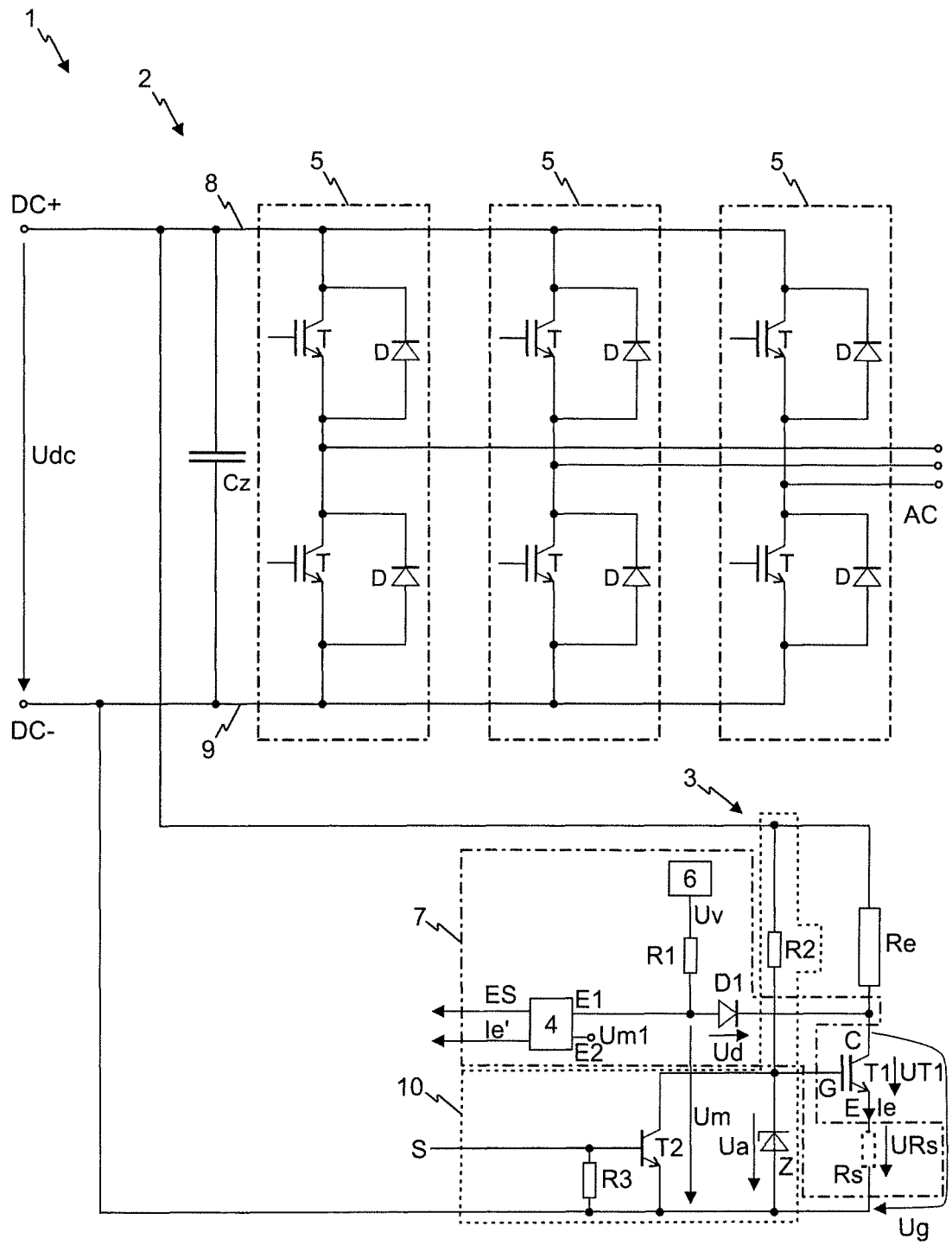

CIRCUIT DEVICE HAVING A POWER CONVERTER AND A CAPACITOR DISCHARGE DEVICE

CROSS REFERENCE TO RELATED APPLICATIONS

This application relates to and claims claim priority from, DE Ser. No.: 10 2019 103 404.3 filed Feb. 12, 2019, the entire contents of which are incorporated herein by reference.

FIGURE SELECTED FOR PUBLICATION

FIG. 1

BACKGROUND OF THE INVENTION

Field of the Invention

The invention relates to a circuit device having a power converter and a capacitor discharge device.

Description of the Related Art

A circuit device is known from EP 2 639 916 A2, having a power converter which comprises a power semiconductor switch and a capacitor discharge device for the electrical discharging of a capacitor of an intermediate electric circuit of the power converter. In technical terms, the capacitor is also referred to as an intermediate circuit capacitor. The capacitor is electrically connected between the first and the second intermediate circuit conductor of the intermediate circuit. If the capacitor is electrically charged, a high intermediate circuit voltage is present between the electrical terminals of the capacitor, and thus between the first and the second intermediate circuit conductor. Further to operation of the power converter, the capacitor can continue to be electrically charged for a relatively long time period, such that the intermediate circuit voltage, even in the event of the interruption of all the power semiconductor switches, continues to assume a relatively high voltage value for a prolonged time period, which is hazardous to persons, e.g. during servicing operations. The circuit device therefore comprises a capacitor discharge device which, upon the actuation thereof by means of a control signal, electrically discharges the capacitor within a relatively short time period (typically a few seconds) to the extent that the intermediate circuit voltage assumes a voltage value which is not hazardous to persons. A disadvantage of the circuit device is that, in the event of a defect in the capacitor discharge device, as a result of which the capacitor is no longer electrically discharged by the capacitor discharge device, the intermediate circuit voltage can assume a voltage value which is hazardous to persons for a relatively long time period. Accordingly, there is a technical requirement for monitoring whether the capacitor discharge device is actually electrically discharging the capacitor.

ASPECTS AND SUMMARY OF THE INVENTION

According to one aspect of the present invention there is provided a circuit device has a power converter, which includes power semiconductor switches and a capacitor which is connected to a first and a second intermediate circuit conductor in an electrically conductive manner, and having a capacitor discharge device for the electrical discharging of the capacitor. The capacitor discharge device includes an actuation device, an electrical discharge resistor and a first semiconductor switch having a first and a second load current terminal, and having a control terminal. The first load current terminal of the first semiconductor switch is connected to the first intermediate circuit conductor via the discharge resistor, and the second load current terminal of the first semiconductor switch connects to the second intermediate circuit conductor. The actuation device on the control terminal of the first semiconductor switch generates an actuating voltage, in accordance with a control signal, for the closing and opening of the first semiconductor switch, and having a capacitor discharge monitoring device, which is designed to monitor an electric monitoring voltage which is present between the first load current terminal of the first semiconductor switch and the second intermediate circuit conductor and, in the event that the monitoring voltage is lower than a monitoring voltage limiting value, to generate a capacitor discharge signal.

The object of the invention is the provision of a circuit device having a power converter which comprises a power semiconductor switch and a capacitor discharge device for the electrical discharging of a capacitor of an intermediate electric circuit of the power converter which reliably monitors whether the capacitor discharge device is discharging the capacitor.

This object is fulfilled by a circuit device having a power converter, which comprises power semiconductor switches which are electrically connected in-circuit between a first intermediate circuit conductor for the conduction of a first DC voltage potential and a second intermediate circuit conductor for the conduction of a second DC voltage potential, and comprising a capacitor which is connected to the first and the second intermediate circuit conductor in an electrically conductive manner, and having a capacitor discharge device for the electrical discharging of the capacitor, wherein the capacitor discharge device comprises an actuation device, an electrical discharge resistor and a first semiconductor switch having a first and a second load current terminal, and having a control terminal, wherein the first load current terminal of the first semiconductor switch is connected to the first intermediate circuit conductor in an electrically conductive manner via the discharge resistor, and the second load current terminal of the first semiconductor switch is connected to the second intermediate circuit conductor in an electrically conductive manner, wherein the actuation device is designed, on the control terminal of the first semiconductor switch, to generate an actuating voltage, in accordance with a control signal, for the closing and opening of the first semiconductor switch, and having a capacitor discharge monitoring device, which is designed to monitor an electric monitoring voltage which is present between the first load current terminal of the first semiconductor switch and the second intermediate circuit conductor and, in the event that the monitoring voltage is lower than a monitoring voltage limiting value, to generate a capacitor discharge signal.

It has proved to be advantageous if the capacitor discharge monitoring device comprises a signal processing device, a voltage source, a first electrical resistor and a diode, wherein a first input of the signal processing device is connected, via the diode, to the first load current terminal of the first semiconductor switch in an electrically conductive manner and, via the first resistor, is connected to the voltage source in an electrically conductive manner, wherein the capacitor discharge monitoring device monitors the electric monitoring voltage which is present between the first load current terminal of the first semiconductor switch and the second intermediate circuit conductor and, in the event that the monitoring voltage is lower than the monitoring voltage limiting value, generates the capacitor discharge signal, wherein the signal processing device, in the event that a measuring voltage, which represents the monitoring voltage, present on the first input of the signal processing device, when the first semiconductor switch is closed, is lower than a measuring voltage limiting value which represents the monitoring voltage limiting value, generates the capacitor discharge signal. As a result, the capacitor discharge monitoring device can be configured in a particularly simple and reliable manner.

In this connection, it has proved to be advantageous if the measuring voltage limiting value is present in the form of a voltage value on a second input of the signal processing device. As a result, the measuring voltage limiting value can be adjusted on the power converter and the capacitor discharge device in a particularly simple manner.

It has further proved to be advantageous if the second load current terminal of the first semiconductor switch is connected to the second intermediate circuit conductor, in an electrically conductive manner, via an intermediate electrical resistor, wherein the signal processing device is configured, when the first semiconductor switch is closed, for the determination and outputting of a capacitor discharge current flowing through the first semiconductor switch, wherein the signal processing device outputs a capacitor discharge current signal which represents the measuring voltage. As a result, the magnitude of the capacitor discharge current, e.g. in a superordinate control circuit, can be made available for the purposes of evaluation.

It has further provided to be advantageous if the first DC voltage potential is configured as a positive DC voltage potential, and the second DC voltage potential as a negative DC voltage potential, or if the first DC voltage potential is configured as a negative DC voltage potential and the second DC voltage potential as a positive DC voltage potential.

It has further proved to be advantageous if the actuation device comprises a second electrical resistor, a Zener diode and a second semiconductor switch, wherein the control terminal of the first semiconductor switch is connected to the first intermediate circuit conductor, in an electrically conductive manner, via the second resistor, and is connected to the second intermediate circuit conductor, in an electrically conductive manner, via the Zener diode, wherein a first load terminal of the second semiconductor switch is connected to the control terminal of the first semiconductor switch in an electrically conductive manner, and a second load terminal of the second semiconductor switch is connected to the second intermediate circuit conductor in an electrically conductive manner, wherein the control signal is fed to a control terminal of the second semiconductor switch. A particularly reliable configuration of the control device is achieved as a result.

The above and other aspects, features and advantages of the present invention will become apparent from the following description read in conjunction with the accompanying drawings, in which like reference numerals designate the same elements.

BRIEF DESCRIPTION OF THE DRAWINGS

FIG. 1 shows a circuit device according to the invention.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

FIG. 1 represents a circuit device 1 according to the invention, having a power converter 2 which comprises power semiconductor switches T, which are electrically connected in-circuit between a first intermediate circuit conductor 8 for the conduction of a first DC voltage potential and a second intermediate circuit conductor 9 for the conduction of a second DC voltage potential. Diodes D are preferably connected, in an antiparallel arrangement, to the power semiconductor switches T. The power semiconductor switches T are generally present in the form of transistors, such as e.g. IGBTs (insulated gate bipolar transistors) or MOSFETs (metal oxide semiconductor field effect transistors), or in the form of thyristors.

The power semiconductor switches T are preferably electrically interconnected with at least one half-bridge circuit 5. The half-bridge circuit 5, as represented in the exemplary embodiment, can here be configured as a 2-level half-bridge circuit, but can also be configured as a multi-level half-bridge circuit, specifically as a 3-level half-bridge circuit. In the context of the exemplary embodiment, the power converter 2 comprises AC voltage terminals AC, each of which is connected to a mid-point circuit node of the respective half-bridge circuit 5 in an electrically conductive manner. If the power converter 2 is operating in an inverter mode, an intermediate circuit voltage Udc which is present between the first and the second intermediate circuit conductor 8 and 9 is converted by the power converter 2 into AC voltages which are present on the AC voltage terminals AC. If the power converter 2 is operating in a rectifier mode, AC voltages which are present on the AC voltage terminals AC are rectified into the intermediate circuit voltage Udc which is present between the first and the second intermediate circuit conductor 8 and 9. The power converter 2 further comprises an electrically conductive first DC voltage potential load terminal DC+, which is connected to the first intermediate circuit conductor 8 in an electrically conductive manner, and an electrically conductive second DC voltage potential load terminal DC−, which is connected to the second intermediate circuit conductor 9 in an electrically conductive manner. The first DC voltage potential, as represented in the exemplary embodiment, can be configured as a positive DC voltage potential, and the second DC voltage potential as a negative DC voltage potential. Alternatively, the first DC voltage potential can be configured as a negative DC voltage potential, and the second DC voltage potential as a positive DC voltage potential.

The power converter 2 further comprises a capacitor Cz, which is connected to the first and the second intermediate circuit conductor 8 and 9 in an electrically conductive manner. Customarily in the art, the capacitor Cz is also referred to as the intermediate circuit capacitor, the function of which, in the operation of the power converter 2, is the storage of electrical energy. The first and second intermediate circuit conductor 8 and 9, in combination with the capacitor Cz, constitute an intermediate DC voltage circuit.

If the capacitor Cz is electrically charged, a high intermediate circuit voltage Udc is present between the electrical terminals of the capacitor, and thus between the first and the second intermediate circuit conductor 8 and 9. The capacitor Cz, further to operation of the power converter 2, can continue to be electrically charged for a relatively long time period, such that the intermediate circuit voltage Udc, even in the event of the interruption of all the power semiconductor switches T, continues to assume a relatively high voltage value for a prolonged time period, which is hazardous to persons, e.g. during servicing operations. The circuit device 1 according to the invention therefore comprises a capacitor discharge device 3 for the electrical discharging of the capacitor Cz which, upon the actuation thereof by means of a control signal S, electrically discharges the capacitor Cz within a relatively short time period (typically a few seconds) to the extent that the intermediate circuit voltage Udc assumes a voltage value which is not hazardous to persons.

The capacitor discharge device 3 comprises an actuation device 10, an electrical discharge resistor Re and a first semiconductor switch T1 having a first and a second load current terminal C and E, and having a control terminal G, wherein the first load current terminal C of the first semiconductor switch T1 is connected to the first intermediate circuit conductor 8 in an electrically conductive manner via the discharge resistor Re, and the second load current terminal E of the first semiconductor switch T1 is connected to the second intermediate circuit conductor 9 in an electrically conductive manner. The discharge resistor Re is preferably configured as a PTC (positive temperature coefficient) resistor, i.e. in comparison with standard technical electrical resistors common in the art, at least in a specific temperature range, it assumes a substantially higher positive and generally non-linear temperature coefficient over the temperature range. The actuation device 10 is designed, on the control terminal G of the first semiconductor switch T1, to generate an actuating voltage Ua, in accordance with a control signal S, for the closing and opening of the first semiconductor switch T1. The actuation device 10 preferably comprises a second electrical resistor R2, a Zener diode Z and a second semiconductor switch T2. The control terminal G of the first semiconductor switch T1 is connected to the first intermediate circuit conductor 8, in an electrically conductive manner, via the second resistor R2, and is connected to the second intermediate circuit conductor 9, in an electrically conductive manner, via the Zener diode Z. In the context of the exemplary embodiment, the anode of the Zener diode Z is connected to the second intermediate circuit conductor 9 in an electrically conductive manner. A first load terminal of the second semiconductor switch T2 is connected to the control terminal G of the first semiconductor switch T1 in an electrically conductive manner, and a second load terminal of the second semiconductor switch T2 is connected to the second intermediate circuit conductor 9 in an electrically conductive manner. The control signal S is fed to a control terminal of the second semiconductor switch T2, and can be generated e.g. by a superordinate control circuit (not represented in FIG. 1). The control terminal of the second semiconductor switch T2 can be connected to the second intermediate circuit conductor 9, in an electrically conductive manner, via a third electrical resistor R3.

The Zener diode Z has a breakdown voltage which exceeds the voltage required for the closing of the first semiconductor switch T1. Thus, provided that the intermediate circuit voltage Udc is greater than the breakdown voltage of the Zener diode which, in the relevant operating range of the capacitor discharge device 3, is always the case, if the second semiconductor switch T2 is open, the first semiconductor switch T1 is closed, on the grounds that the actuating voltage Ua which is present on the control terminal G of the first semiconductor switch T1 corresponds to the breakdown voltage of the Zener diode Z which, in turn, is sufficiently high such that the first semiconductor switch T1 is closed. If the first semiconductor switch T1 is closed, the capacitor discharge current Ie, by means of which the capacitor Cz is discharged, flows through it and through the discharge resistor Re. If the capacitor Cz is to be discharged by the capacitor discharge device 3, the voltage value of the control signal S is e.g. 0 V, such that the second semiconductor switch T2 is opened. If the capacitor Cz is not to be discharged by the capacitor discharge device 3, the control signal S then assumes a voltage value which is sufficiently high such that the second semiconductor switch T2 is closed, and the first semiconductor switch T1 is thus opened, as the actuating voltage Ua is lower than the voltage required for the closing of the first semiconductor switch T1.

The circuit device 1 according to the invention comprises a capacitor discharge monitoring device 7, which is designed to monitor an electric monitoring voltage Ug which is present between the first load current terminal C of the first semiconductor switch T1 and the second intermediate circuit conductor 9 and, in the event that the monitoring voltage Ug is lower than a monitoring voltage limiting value Ug1, to generate a capacitor discharge signal ES. The capacitor discharge signal ES can be transmitted, e.g. to a superordinate control circuit, as an input variable. If the superordinate control circuit generates a control signal S for the closing of the first semiconductor switch T1, it then receives feedback, by way of the capacitor discharge signal ES, as to whether the capacitor Cz is actually being discharged by the capacitor discharge device 3. A defective capacitor discharge device 3 can thus be reliably detected by the superordinate control circuit.

The capacitor discharge monitoring device 7 preferably comprises a signal processing device 4, a voltage source 6, a first electrical resistor R1 and a diode D1. A first input E1 of the signal processing device 4 is connected, via the diode D1, to the first load current terminal C of the first semiconductor switch T1 in an electrically conductive manner, and, via the first resistor R1, is connected to the voltage source 6 in an electrically conductive manner. The voltage source 6 generates an electric voltage having a voltage value Uv. In the context of the exemplary embodiment, the cathode of the diode D1 is arranged in a manner electrically facing the first load current terminal C of the first semiconductor switch T1. The signal processing device 4 is configured, in the event that a measuring voltage Um, which represents the monitoring voltage Ug, present on the first input E1 of the signal processing device 4, when the first semiconductor switch T1 is closed, is lower than a measuring voltage limiting value Um1 which represents the monitoring voltage limiting value Ug1, to generate the capacitor discharge signal ES. The measuring voltage limiting value Um1, in the exemplary embodiment, is present in the form of a corresponding voltage, which assumes the measuring voltage limiting value Um1 as a voltage value on a second input E2 of the signal processing device 4. Alternatively, the measuring voltage limiting value Um1 can also be present in the form of a value which is saved in the signal processing device 4, or can be inherently present in the form of a logic level threshold (e.g. of an analogue-digital converter or a logic gate), below which the signal processing device 4 interprets a voltage which is present on the second input E2 as a logic value "0". When the first semiconductor switch T1 is opened, the diode D1 assumes a non-conducting state, and isolates the high voltage level which is present on the side of the first semiconductor switch T1 from the low voltage level which is present on the side of the capacitor discharge monitoring device 7. Immediately, during the closing process of the first semiconductor switch T1, the monitoring voltage Ug falls somewhat below the voltage value Uv, the diode D1 commences electrical conduction, and the measuring voltage Um corresponds to the sum of the voltage Ud across the first diode D1 and the monitoring voltage Ug, wherein the voltage Ud is constant, such that the measuring voltage Um represents the monitoring voltage Ug, with the result that, in the exemplary embodiment, Um=Ug+Ud. In the exemplary embodiment, the measuring voltage limiting value Um1 is derived in an analogous manner from the desired monitoring voltage limiting value Ug1, whereby Um1=Ug1+Ud, such that the measuring voltage limiting value Um1 represents the monitoring voltage limiting value Ug1. Accordingly, for the desired monitoring voltage limiting value Ug1, a measuring voltage limiting value Um1 which represents the latter is determined beforehand, and a voltage having the measuring voltage limiting value Um1 in the form of a voltage value is applied to the second input E2 of the signal processing device 4. It should be observed at this point that, within the meaning of the invention, under the concept whereby a second variable Y represents a first variable x, it is understood that the second variable y is linear to the first variable x, i.e. $y=a \cdot x+c$, wherein a and c assume a constant value. In the exemplary embodiment $a=1$ and $c=Ud$.

The second load current terminal E of the first semiconductor switch T1 can be connected to the second intermediate circuit conductor 9, via an intermediate electrical resistor Rs, in an electrically conductive manner, wherein the signal processing device 4 is configured, when the first semiconductor switch T1 is closed, for the determination and outputting of a capacitor discharge current Ie flowing through the first semiconductor switch T1, wherein the signal processing device 4 outputs a capacitor discharge current signal Ie' which represents the measuring voltage Um. As a result, the magnitude of the capacitor discharge current Ie, e.g. in a superordinate control circuit, can be made available for the purposes of evaluation. As the electrical potential on the second load current terminal E of the first semiconductor switch T1 is increased by a falling intermediate resistor voltage URs across the intermediate resistor Rs, the Zener diode Z should assume a higher breakdown voltage, corresponding to the maximum possible voltage value of the intermediate resistor voltage URs in service, than in the absence of the intermediate resistor Rs, such that the first semiconductor switch T1, when the second semiconductor switch T2 is opened, is reliably closed.

Naturally, provided that this is not excluded per se, characteristics which are specified in the singular can also be present in the circuit device according to the invention in the plural.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A circuit device having a power converter, comprising:
   a plurality of power semiconductor switches which are respectively electrically connected in-circuit between a first intermediate circuit conductor for the conduction of a first DC voltage potential and a second intermediate circuit conductor for the conduction of a second DC voltage potential;
   a capacitor which is connected to the first and the second intermediate circuit conductor in an electrically conductive manner;
   a capacitor discharge device for the electrical discharging of the capacitor, wherein the capacitor discharge device, further comprises:
   an actuation device, an electrical discharge resistor and a first semiconductor switch having a first and a second load current terminal and having a control terminal;

wherein the first load current terminal of the first semiconductor switch is connected to the first intermediate circuit conductor in an electrically conductive manner via the discharge resistor, and the second load current terminal of the first semiconductor switch is connected to the second intermediate circuit conductor in an electrically conductive manner;

wherein the actuation device is designed, on the control terminal of the first semiconductor switch, to generate an actuating voltage, in accordance with a control signal, for the closing and opening of the first semiconductor switch; and a capacitor discharge monitoring device, which is designed to monitor an electric monitoring voltage which is present between the first load current terminal of the first semiconductor switch and the second intermediate circuit conductor and, in the event that the monitoring voltage is lower than a monitoring voltage limiting value, to generate a capacitor discharge signal.

2. The circuit device, according to claim 1, wherein:
the capacitor discharge monitoring device, further comprises:
  a signal processing device, a voltage source, a first electrical resistor and a diode;
  wherein a first input of the signal processing device is connected, via the diode, to the first load current terminal of the first semiconductor switch in an electrically conductive manner and, via the first resistor, is connected to the voltage source in an electrically conductive manner; and
wherein the capacitor discharge monitoring device monitors the electric monitoring voltage which is present between the first load current terminal of the first semiconductor switch and the second intermediate circuit conductor and, in the event that the monitoring voltage is lower than the monitoring voltage limiting value, generates the capacitor discharge signal, wherein the signal processing device, in the event that a measuring voltage, which represents the monitoring voltage, present on the first input of the signal processing device, when the first semiconductor switch is closed, is lower than a measuring voltage limiting value which represents the monitoring voltage limiting value, generates the capacitor discharge signal.

3. The circuit device, according to claim 2, wherein:
the measuring voltage limiting value is present in the form of a voltage value on a second input of the signal processing device.

4. The circuit device, according to claim 2, wherein:
the second load current terminal of the first semiconductor switch is connected to the second intermediate circuit conductor, in an electrically conductive manner, via an intermediate electrical resistor, wherein the signal processing device is configured, when the first semiconductor switch is closed, for the determination and outputting of a capacitor discharge current flowing through the first semiconductor switch; and
wherein the signal processing device outputs a capacitor discharge current signal which represents the measuring voltage.

5. The circuit device, according to claim 1, wherein:
the first DC voltage potential is configured as a positive DC voltage potential, and the second DC voltage potential as a negative DC voltage potential, or in that the first DC voltage potential is configured as a negative DC voltage potential and the second DC voltage potential as a positive DC voltage potential.

6. The circuit device, according to claim 1, wherein:
the actuation device comprises a second electrical resistor, a Zener diode and a second semiconductor switch;
wherein the control terminal of the first semiconductor switch is connected to the first intermediate circuit conductor, in an electrically conductive manner, via the second resistor, and is connected to the second intermediate circuit conductor, in an electrically conductive manner, via the Zener diode; and
a first load terminal of the second semiconductor switch is connected to the control terminal of the first semiconductor switch in an electrically conductive manner, and a second load terminal of the second semiconductor switch is connected to the second intermediate circuit conductor in an electrically conductive manner; and
wherein the control signal is fed to a control terminal of the second semiconductor switch.

* * * * *